(12) United States Patent
Gao et al.

(10) Patent No.: US 10,204,163 B2
(45) Date of Patent: Feb. 12, 2019

(54) ACTIVE PREDICTION OF DIVERSE SEARCH INTENT BASED UPON USER BROWSING BEHAVIOR

(75) Inventors: Bin Gao, Beijing (CN); Tie-Yan Liu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 951 days.

(21) Appl. No.: 12/762,423

(22) Filed: Apr. 19, 2010

(65) Prior Publication Data

US 2011/0258148 A1 Oct. 20, 2011

(51) Int. Cl.
*G06F 17/30* (2006.01)

(52) U.S. Cl.
CPC .............................. *G06F 17/30867* (2013.01)

(58) Field of Classification Search
CPC ................................................. G06F 17/30876
See application file for complete search history.

(56) References Cited

U.S. PATENT DOCUMENTS

| | | | | |
|---|---|---|---|---|
| 5,218,536 A * | 6/1993 | McWherter | .................... | 715/267 |
| 6,584,465 B1 * | 6/2003 | Zhu et al. | | |
| 6,891,154 B2 * | 5/2005 | Zhu et al. | ...................... | 250/282 |
| 6,999,959 B1 * | 2/2006 | Lawrence et al. | | |
| 7,072,827 B1 * | 7/2006 | Carmel et al. | ..................... | 704/9 |
| 7,162,473 B2 | 1/2007 | Dumais | | |
| 7,363,282 B2 | 4/2008 | Karnawat | | |
| 7,461,073 B2 * | 12/2008 | Gao et al. | | |
| 7,533,082 B2 | 5/2009 | Abbott | | |
| 7,590,619 B2 | 9/2009 | Hurst-Hiller | | |
| 7,603,349 B1 | 10/2009 | Kraft | | |
| 7,698,331 B2 * | 4/2010 | Carson, Jr. | ......... | G06F 17/30864 707/728 |
| 7,743,058 B2 * | 6/2010 | Liu et al. | ...................... | 707/737 |
| 7,805,303 B2 * | 9/2010 | Sugihara et al. | ............. | 704/257 |
| 7,818,338 B2 * | 10/2010 | Miller et al. | .................. | 707/770 |

(Continued)

OTHER PUBLICATIONS

Zhai et al. The Dual Role of Smoothing in the Language Modeling Approach. LMIR 2001. Available online at http://citeseerx.ist.psu.edu/viewdoc/summary?doi=10.1.1.21.1285.*

(Continued)

*Primary Examiner* — Polina G Peach
(74) *Attorney, Agent, or Firm* — Rainier Patents, P.S.

(57) ABSTRACT

Many search engines attempt to understand and predict a user's search intent after the submission of search queries. Predicting search intent allows search engines to tailor search results to particular information needs of the user. Unfortunately, current techniques passively predict search intent after a query is submitted. Accordingly, one or more systems and/or techniques for actively predicting search intent from user browsing behavior data are disclosed herein. For example, search patterns of a user browsing a web page and shortly thereafter performing a query may be extracted from user browsing behavior. Queries within the search patterns may be ranked based upon a search trigger likelihood that content of the web page motivated the user to perform the query. In this way, query suggestions having a high search trigger likelihood and a diverse range of topics may be generated and/or presented to users of the web page.

21 Claims, 11 Drawing Sheets

(56) References Cited

U.S. PATENT DOCUMENTS

| | | | | |
|---|---|---|---|---|
| 7,827,170 | B1* | 11/2010 | Horling | G06F 17/3053 707/722 |
| 7,840,946 | B2* | 11/2010 | Gupta et al. | 717/124 |
| 7,882,121 | B2* | 2/2011 | Bruno et al. | 707/759 |
| 7,921,109 | B2* | 4/2011 | Parikh et al. | 707/731 |
| 8,225,195 | B1* | 7/2012 | Bryar | G06F 17/30905 715/200 |
| 8,260,771 | B1* | 9/2012 | Ortega | G06F 17/30997 707/723 |
| 8,386,509 | B1* | 2/2013 | Scofield et al. | 707/769 |
| 8,423,538 | B1* | 4/2013 | Sadikov | G06F 17/30389 707/706 |
| 8,442,987 | B2* | 5/2013 | Leggetter et al. | 707/749 |
| 8,583,675 | B1* | 11/2013 | Haahr | G06F 17/30442 707/721 |
| 8,918,417 | B1* | 12/2014 | Das et al. | 707/765 |
| 2002/0198882 | A1* | 12/2002 | Linden | G06F 17/30867 |
| 2005/0015366 | A1* | 1/2005 | Carrasco | G06F 17/30675 |
| 2006/0041550 | A1* | 2/2006 | Bennett | G06F 17/30867 |
| 2006/0122998 | A1* | 6/2006 | Bar-Yossef | G06F 17/30864 |
| 2006/0235843 | A1* | 10/2006 | Musgrove et al. | 707/6 |
| 2007/0078828 | A1* | 4/2007 | Parikh et al. | 707/3 |
| 2007/0124202 | A1 | 5/2007 | Simons | |
| 2007/0185851 | A1* | 8/2007 | Bruno et al. | 707/4 |
| 2007/0185865 | A1* | 8/2007 | Budzik | G06F 17/30389 |
| 2007/0192350 | A1* | 8/2007 | Gao et al. | 707/102 |
| 2007/0208730 | A1 | 9/2007 | Agichtein | |
| 2007/0239671 | A1* | 10/2007 | Whitman et al. | 707/2 |
| 2008/0005079 | A1 | 1/2008 | Flake | |
| 2008/0104070 | A1* | 5/2008 | Lonchar | 707/6 |
| 2008/0168061 | A1* | 7/2008 | Liu et al. | 707/7 |
| 2008/0189232 | A1* | 8/2008 | Dunning et al. | 706/45 |
| 2008/0229260 | A1* | 9/2008 | Icho et al. | 725/46 |
| 2008/0235187 | A1* | 9/2008 | Gade | G06F 17/3064 |
| 2008/0281817 | A1* | 11/2008 | White | G06F 17/30867 |
| 2008/0306937 | A1* | 12/2008 | Whilte et al. | 707/5 |
| 2009/0037355 | A1* | 2/2009 | Brave | G06F 17/30867 706/45 |
| 2009/0106224 | A1* | 4/2009 | Roulland | G06F 17/30646 |
| 2009/0119248 | A1* | 5/2009 | Sundaresan et al. | 707/2 |
| 2009/0282022 | A1* | 11/2009 | Bennett | G06F 17/30675 |
| 2009/0300002 | A1* | 12/2009 | Thomas | G06F 17/30522 |
| 2009/0327270 | A1 | 12/2009 | Teevan | |
| 2010/0114929 | A1* | 5/2010 | Bonchi | G06F 17/3064 707/759 |
| 2010/0125572 | A1* | 5/2010 | Poblete et al. | 707/722 |
| 2010/0235338 | A1* | 9/2010 | Gabriel | G06F 17/3053 707/706 |
| 2010/0306229 | A1* | 12/2010 | Timm | G06F 17/3064 707/767 |
| 2011/0047171 | A1* | 2/2011 | Paparizos et al. | 707/760 |
| 2011/0093452 | A1* | 4/2011 | Jain | 707/723 |
| 2011/0093459 | A1* | 4/2011 | Dong | G06F 17/30867 707/725 |
| 2011/0145175 | A1* | 6/2011 | Agarwal | G06N 99/005 706/12 |
| 2011/0184925 | A1* | 7/2011 | Muth | G06F 17/30864 707/706 |
| 2011/0246457 | A1* | 10/2011 | Dong | G06Q 10/06 707/725 |

OTHER PUBLICATIONS

Liu et al. Letor: Benchmark dataset for research on learning to rank for information retrieval. Proceedings of SIGIR 2007 Workshop on Learning to Rank for Information Retrieval. 2007. Available online at http://citeseer.ist.psu.edu/viewdoc/summary?doi=10.1.1.159.4108.*

Huanhuan Cao, Daxin Jiang, Jian Pei, Qi He, Zhen Liao Enhong, Chen I Hang Li "Context-Aware Query Suggestion by Mining Click-Through and Session Data" 2008 ACM.*

Hao Ma, Haixuan Yang, Irwin King, Michael R. Lyu "Learning Latent Semantic Relations from Clickthrough Data for Query Suggestion", 2008 ACM.*

Ricardo Baeza-Yates, Barbara Poblete "Query-Sets: Using Implicit Feedback and Query Patterns to Organize Web Documents", 2008 ACM.*

Hongbo Deng, Michael R. Lyu, Irwin King "A Generalized Co-HITS Algorithm and Its Application to Bipartite Graphs", 2009, ACM.*

Mei et al. "Query Suggestion Using Hitting Time", 2008 ACM.*

Barbara Poblete; Ricardo Baeza-Yates "Query-Sets: Using Implicit Feedback and Query Patterns to Organize Web Documents", 2008 ACM.*

Li; et al., "Learning Query Intent from Regularized Click Graphs"—Published Date: Jul. 20-24, 2008 http://research.microsoft.com/en-us/um/people/xiaol/papers/sigir2008.pdf.

Hu; et al., "Understanding User's Query Intent with Wikipedia"—Published Date: Apr. 20-24, 2009 http://www2009.eprints.org/48/1/p471.pdf.

Piwowarski; et al., "Predictive User Click Models Based on Clickthrough History"—Published Date: Nov. 6-8, 2007, http://citeseerx.ist.psu.edu/viewdoc/download?doi=10.1.1.99.8355&rep=rep1&type=pdf.

Agichtein; et al., "Learning User Interaction Models for Predicting Web Search Result Preferences"—Published Date: Aug. 6-11, 2006, http://citeseerx.ist.psu.edu/viewdoc/download?doi=10.1.1.91.956&rep=rep1&type=pdf.

Baeza-Yates et al, "Query recommendation using query logs in search engines," EDBT Workshops, 2004, pp. 588-596, 10 pages.

Baeza-Yates et al, "Modern Information Retrieval," Addison Wesley, 1999, 103 pages.

Burges et al, "Learning to Rank using Gradient Descent," ICML, 2005, 8 pages.

Cao et al, "Context-Aware Query Suggestion by Mining Click-Through and Session Data," KDD '08, Aug. 24-27, 2008, Las Vegas, Nevada, 9 pages.

Cao et al, "Learning to Rank: From Pairwise Approach to Listwise Approach," ICML, 2007, Corvallis, Oregon, 8 pages.

Chapelle et al., "Semi-Supervised Learning," MIT Press, Cambridge, MA, 2006, 524 pages.

Cheng et al., "Actively Predicting Diverse Search Intent from User Browsing Behaviors," WWW 2010, Apr. 26-30, 2010, Raleigh North Carolina, 10 pages.

Clarke et al. "Novelty and Diversity in Information Retrieval Evaluation," SIGIR'08, Jul. 20-24, 2008, Singapore, 8 pages.

Freund et al, "An Efficient Boosting Algorithm for Combining Preferences," Journal of Machine Learning Research, 2003 (4), 37 pages.

Gollapudi et al., "An Axiomatic Approach for Result Diversification," WWW 2009, Apr. 20-24, 2009, Madrid, Spain, pp. 381-390, 10 pages.

Grineva et al., "Extracting Key Terms From Noisy and Multi-theme Documents," WWW 2009, Apr. 20-24, 2009, Madrid, Spain, pp. 661-670, 10 pages.

Joachims, Thorsten, "Optimizing Search Engines using Clickthrough Data," SIGKDD '02, Edmonton, Alberta, Canada, 10 pages.

Jones et al., "Generating Query Substitutions," WWW 2006, May 23-26, 2006, Edinburgh, Scotland, 10 pages.

Mihalcea et al., "Wikify! Linking Documents to Encyclopedic Knowledge," CIKM '07, Nov. 6-8, 2007, Lisboa, Portugal, 9 pages.

Radlinski et al., "Learning Diverse Rankings with Multi-Armed Bandits," ICML, 2008, Helsinki, Finland, 8 pages.

Shi et al., "Normalized Cuts and Image Segmentation," IEEE Transactions on Pattern Analysis and Machine Intelligence, vol. 22, No. 8, Aug. 2000, pp. 888-905, 18 pages.

White et al., "Studying the Use of Popular Destinations to Enhance Web Search Interaction," ISGIR '07, Jul. 23-27, 2007, Amsterdam, The Netherlands, pp. 159-166, 8 pages.

White et al., "Predicting User Interests from Contextual Information," ISGIR '09, Jul. 19-23, 2009, Boston, MA, 8 pages.

Zhai et al., "A Study of Smoothing Methods for Language Models Applied to Ad Hoc Information Retrieval," SIGIR '01, Sep. 9-12, 2001, New Orleans, Louisiana, 9 pages.

(56) References Cited

OTHER PUBLICATIONS

Wikipedia, "Correlation and dependence," retrieved on Mar. 2, 2010 from «http://en.wikipedia.org/wiki/Correlation», 4 pages.
Wikipedia, "Kullback-Leibler divergence," retrieved on Feb. 15, 2009 from «http://en.wikipedia.org/wiki/Kullback-Liebler_divergence», 6 pages.
Sullivan, Danny, "Nielsen NetRatings: Aug. 2007 Search Share Puts Google on Top, Microsoft Holding Gains," retrieved on Mar. 5, 2009 at «http://searchengineland.com/nielsen-netratings-august-2007-search-share-puts-google-on-top-microsoft-holding-gains-12243», 7 pages.
"U.S. Search Engine Market Share Data—Jan 2009," retrieved on Mar. 23, 2010 from «http://www.accuracast.com/search-daily-news/seo-7471/us-search-engine-market-share-data-jan-2009/», 4 pages.
"comScore Releases Aug. U.S. Search Engine Rankings," retrieved on Oct. 22, 2009 from «http://www..comscore.com/Press_Events/Communicados_de_prensa/2007/node_1285/Top_US_Search_Engines», 2 pages.
Cossock et al., "Subset ranking using regression," COLT, 2006, Springer-Verlag, Berlin, Heidelberg, pp. 605-619, 15 pages.
Witten et al., "Kea: Practical Automatic Keyphrase Extraction," ACM DL, 1999, pp. 254-255, 2 pages.
Wikipedia, "Jensen-Shannon divergence," retrieved at «http://en.wikipedia.org/wiki/Jensen-Shannon divergence», 3 pages.

\* cited by examiner

ACTIVE PREDICTION OF DIVERSE SEARCH INTENT BASED UPON USER BROWSING BEHAVIOR

BACKGROUND

Many internet users discover and interact with internet content using search queries. For example, a user may search for websites, images, videos, and other internet content relating by submitting a query to a search engine. It may be advantageous for the search engine to predict the user's search intent, so that the search engine may provide relevant websites and additional internet content tailored to the user's interest. Unfortunately, current techniques passively determine search intent, which does not account for what motivated the user to perform the queries. That is, the prediction is performed after users submit their queries to the search engine. However, these predictions may not account for previous web page content viewed by the user before submitting the query. For example, a user may browse a web page that triggers/motivates the user to perform a search query for additional information related to content within the web page. Current techniques do not take content that motivated the search into account when predicting the user's search intent.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for determining a diverse subset of queries are disclosed herein. In particular, query suggestions may be determined based upon correlating user queries performed shortly after users visited a web page with content of the web page. The query suggestions may be ranked, diversified, and/or presented to users. It may be appreciated that shortly after may be interpreted as a time period between a user visiting a web page and the user submitting a query after visiting the page. In one example, shortly after may be interpreted as the immediate next query the user submits after visiting the web page without other intervening queries. In another example, shortly after may refer to a query the user submits within a time period (e.g., 5 minutes, 30 minutes, 24 hours, a week, etc.) of visiting the web page. In any event, the time period should be short enough so that it may be reasonable to infer that a correlation exists between the query and the previously visited web page. That is, the query was, at least in some respect, submitted in response to and/or inspired by the web page.

Accordingly, browser search patterns may be extracted from user search behavior (e.g., URL, timestamp, query data, web page content, etc.). A browse search pattern may be indicative of a search event performed by a user shortly after a browse event. The browse search pattern may comprise a URL of the web page associated with the browse event and a query associated with the search event. It may be appreciated that the correlation between the web page and the query (e.g., the content within the web page that triggered the user to perform the query) may be useful in providing relevant query suggestions to other users. A bipartite graph may be built based upon the browse search patterns. For example, the bipartite graph may comprise web page nodes representing web pages visited by the user, query nodes corresponding to queries performed shortly after the web pages were visited, and web page to query edges connecting web pages with queries. A web page to query edge may have a weight corresponding to a frequency at which users performed a query shortly after visiting the web page.

For respective web pages within the bipartite graph, a candidate query set comprising one or more queries executed shortly after users visited a web page may be generated. Features of one or more queries associated with a web page may be extracted based upon the bipartite graph, the web page, and/or the candidate query set. In one example, the length, word court, maximum word length, and/or other characteristics of the query may be extracted as features. In another example, features may be determined by analyzing the URL, title, and body of the web page. The one or more queries associated with the web page (e.g., queries within a candidate query set) may be ranked based upon a learning to rank model and/or the extracted features. It may be appreciated that a search trigger likelihood may be interpreted as the likelihood that content of the web page triggered the user to perform the query. A query may be ranked according to the likelihood that content of the web page triggered the user to perform the query. In one example, queries with a low search trigger likelihood may be eliminated.

A diverse subset of queries may be selected from within the one or more ranked queries based upon an objective function. In one example, the objective function may comprise one or more features utilized in selected queries. In one example, a dissimilarity measurement feature may be implemented to select queries with diverse topics with respect to one another (e.g., a query concerning bikes along with a query concerning fruit have diverse topics). In this way, the diverse subset of queries may comprise queries have a diverse range of topics that may interest a variety of users have diverse interests. In another example, a search trigger likelihood feature may be implemented to select queries having a high search trigger likelihood (queries with a high likelihood that content within the web page triggered the user to perform the query). In this way, the diverse subset of queries may comprise queries with diverse topics and high search trigger likelihoods. The diverse subset of queries may be presented to users visiting the web page as query suggestions.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
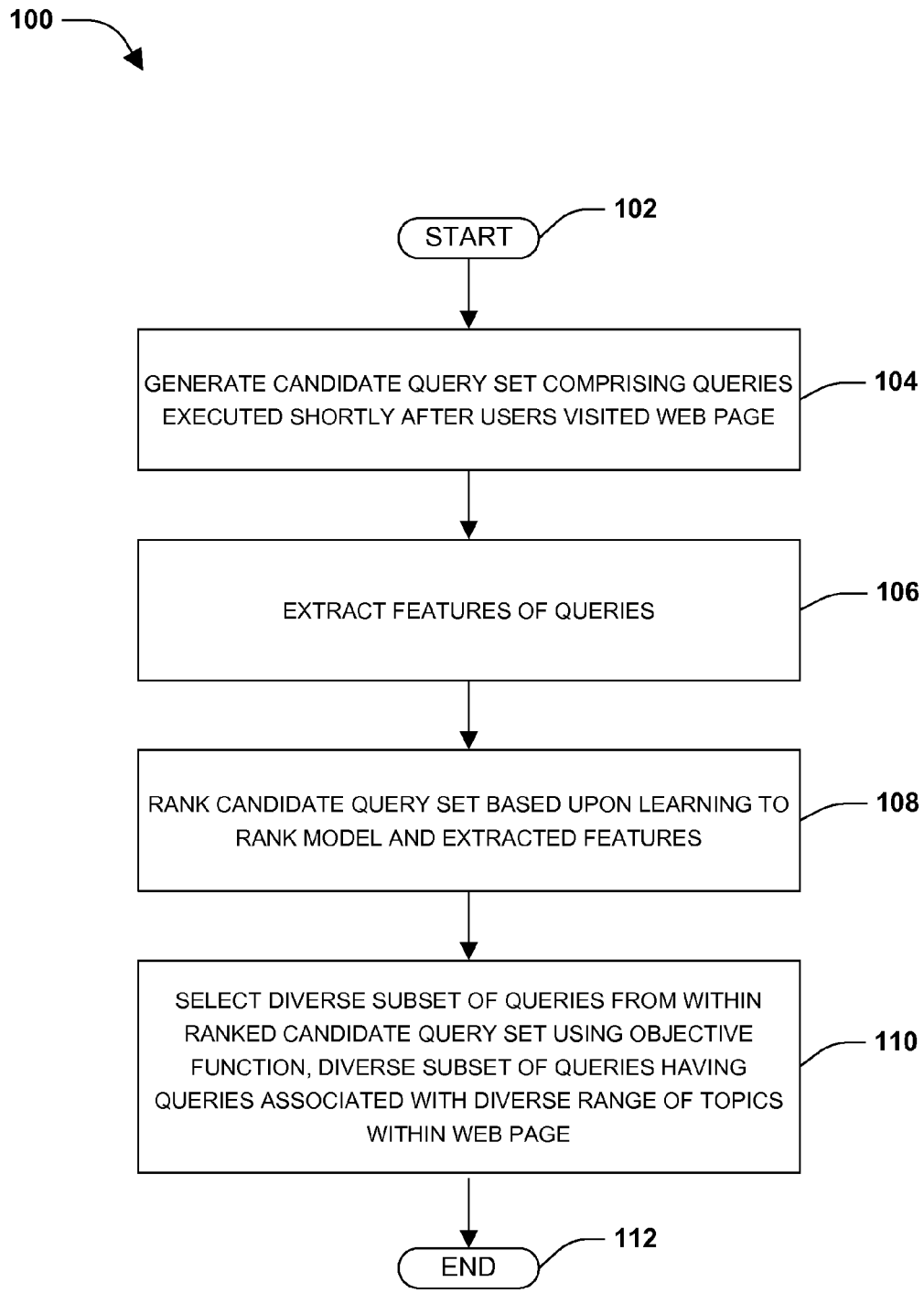
FIG. 1 is a flow chart illustrating an exemplary method of determining a diverse subset of queries.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

A user's internet experience may be enhanced by providing customized information tailored to the user's interests. For example, techniques have been developed to better understand a user's search intent when submitting a search query. Predictions of user search intent may be made based upon previous queries issued by the user and/or similar queries issued by other users. However, search engines may not be aware of how the desire for the information was originally generated and/or what motivated the user to perform the query. As a result, contextual information obtained by search engines may be insufficient to generate high quality and personalized search results. Furthermore, predictions may be performed in a passive manner after the user already submitted a query. Unfortunately, these techniques do not draw upon previous browsing behavior of users to draw correlations between content within web pages and the user motivation behind the queries.

Accordingly, one or more systems and/or techniques for actively predicting diverse search intent from user browsing behavior are provided herein. Queries issued by users shortly after browsing a web page may be extracted from user browsing behavior data. The queries may be ranked according to their likelihood of being triggered by content within the web page. For example, a user may browser a web page regarding active living. A user search for "bike trails" may be deemed to have a high search trigger likelihood because it is likely content of the active living web page motivated the user to search for "bike trails". In contrast, a second visitor of the web page may search for "stock quotes" after visiting the web page. "Stock quotes" may be deemed to have a low search trigger likelihood because it is unlikely content of the active living web page motivated the user to search for "stock quote". Because different users may be motivated by different topics within a single web page, an objective function (e.g., an optimization algorithm) may be implemented to diversify the ranked list of queries. In this way, a diverse subset of queries having diverse topics may be suggested to users.

One embodiment of determining a diverse subset of queries is illustrated by an exemplary method 100 in FIG. 1. At 102, the method begins. At 104, a candidate query set comprising queries executed shortly after users visited a web page is generated (e.g., a first query executed by a first user, a second query executed by a second user, etc.). Queries may be labeled to help characterize them because users may be motivated by a variety of reasons (e.g., motivated by content of a previously visited web page, checking a famous web page, motivated by extraneous sources, etc.). In one example, a query may be labeled as: a key phrase of the web page; not a key phrase but relating to content within the web page; relating to a famous website; relating to a topic unrelated to the web page; a duplicate of a previous query; a refinement of a previous query; an unknown pattern; etc. The labels may be useful in determining the likelihood that a web page triggered a user to perform a query. For example, a query relating to content within the web page may have a high likelihood of being trigged by the web page. In contrast, a query that is a refinement of a previous query probably has a low likelihood of being triggered by the web page because the refined query is likely triggered by that fact that the original search results, such as the previous web page visited, were unsatisfactory. In one example, queries may be excluded from the candidate query set based upon having labels indicating a low search trigger likelihood.

In one example, a bipartite graph may be built based upon one or more web pages and their respective candidate query sets. The bipartite graph may comprise web page nodes representing web pages visited by the user, query nodes corresponding to queries performed shortly after the web pages were visited, and web page to query edges connecting web pages with queries. A web page to query edge may have a weight corresponding to a frequency at which users performed a query shortly after visiting the web page.

At 106, features of the one or more queries (e.g., queries within a candidate query set of a web page) may be extracted. For example, features may be extracted from a URL of the web page, a title of the web page, a body of the web page, and/or the query. In regards to the query, query visibility, query popularity, and/or pattern frequency may be extracted from within the bipartite graph as features. Query length, unique word count, and/or maximum word length may be extracted from the query as features. In regards to the web page, term frequency, inverse document frequency, LMIR with ABS smoothing, LMIR with DIR smoothing, and/or LMIR with JM smoothing may be used in extracting features from the web page. It may be appreciated that other features than those listed may be implemented. Features may be utilized in determining the likelihood that content from a web page triggered a user to perform a query (search trigger likelihood).

At 108, queries within the candidate query set may be ranked based upon a learning to rank model and/or the extracted features. It may be appreciated that a variety of pairwise learning to rank algorithms, such as Ranking SVM, RankBoost, RankNet, etc. may be adopted to learn the ranking function. In one example, a top percentage of ranked queries (e.g., top 10% highest ranked queries) may be retained, while the remaining (e.g., lower ranked queries) may be eliminated from the candidate query set.

At 110, a diverse subset of queries may be selected from within the ranked candidate query set using an objective function. In one example, the objective function may comprise a dissimilarity measurement feature, a search trigger likelihood feature, and/or other optimization functionality. The search trigger likelihood feature may select queries for the diverse subset of queries based upon queries having a high likelihood of being triggered based upon content of the web page (e.g., queries having a high search trigger likelihood). In one example, the dissimilarity measurement feature may be implemented by a Jensen-Shannon divergence on a clean version of the bipartite graph (e.g., the edges are re-weighted with normalized scores for edges). The dissimilarity measurement feature may be configured to select ranked queries having an overall diverse range of topics. For example, a ranked candidate query set may have the queries: "sports", "health", "blueberries", "bike trails", "travel", "fruit", "apples", "health foods", etc. The dissimilarity measurement feature may select "sports", "travel", and "health foods" as a diverse subset of queries because their respective topics cover a wide range of interests. This allows for query suggestions to be presented to users having diverse interests.

The diverse subset of queries may be presented to a user as query suggestions. In one example, a healthy living web page may have a variety of users visit the web page and execute search queries shortly after their visit. A candidate query set may be generated based upon search patterns indicative of a browse event of the web page and shortly thereafter a search event of a query. Features of the queries within the candidate query set may be extracted. The candidate query set may be ranked, such that queries having a high likelihood of being triggered by content of the healthy living web page are kept (e.g., "running", "blueberries", etc.), while other queries with low search trigger likelihoods are eliminated (e.g., "check my social network", "see stock quotes", "etc."). A diverse subset of the queries may be selected based upon queries having a diverse range of topics (e.g., if "health food" is the only query so far, then a query of "exercise" would be chosen over "blueberries" because the diverse subset of queries already has a food topic query—"health food"). The diverse subset of queries may be presented to users visiting the healthy living web page. At 112, the method ends.

Figure 2:
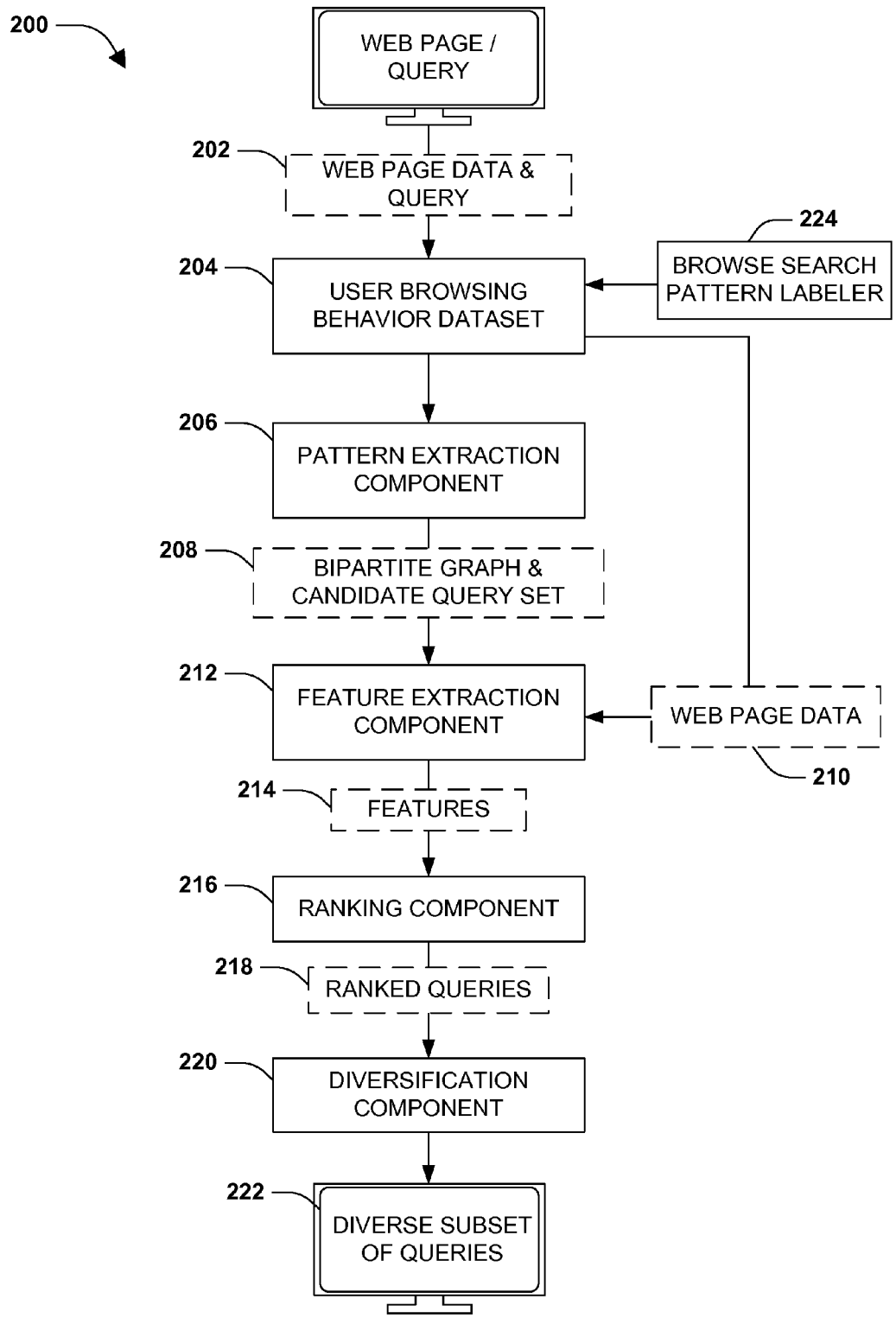
FIG. 2 is a component block diagram illustrating an exemplary system for determining a diverse subset of queries.

FIG. 2 illustrates an example of a system 200 configured for determining a diverse subset of queries 222. The system 200 may comprise a pattern extraction component 206, a feature extraction component 212, a ranking component 216, a diversification component 220, and/or a browse search pattern labeler 224. A user browsing behavior data set 204 may be configured to store user browsing data (e.g., web page data & query 202). For example, a user may browse a web page, which may be stored as a browse event. The user may perform a query search, which may be stored as a query event. In one example, the browse search pattern labeler may be configured to label one or more queries (e.g., queries within the user browsing behavior dataset 204, queries within the candidate query set 208, etc.) to aid in determining a likelihood that content of a web page triggered a user to perform a query. In one example, the browser search pattern labeler 224 may be configured to label a query as: a key phrase of the web page; not a key phrase but relating to content within the web page; relating to a famous website; relating to a topic unrelated to the web page; a duplicate of a previous query; a refinement of a previous query; an unknown pattern; etc. In another example, the ranking component 216 may take into account the labels of queries when ranking queries. In another example, the diversification component 220 may take into account the labels of queries when executing the objective function.

The pattern extraction component 206 may be configured to extract browse search patterns from within the user browsing behavior dataset 204. A browse search pattern may correspond to a user search event occurring shortly after a user search event. That is, a browser search pattern is indicative of user browsing behavior where a user visits a web page and shortly thereafter performs a query search. A browse search pattern may comprise a URL of a web page associated with the browse event and a query associated with the search event. The pattern extraction component 206 may be configured to build a bipartite graph and/or a candidate query set (e.g., a bipartite graph & candidate query set 208). In one example, the pattern extraction component 206 may build the bipartite graph based upon the browse search patterns. The bipartite graph may comprise web pages nodes, query nodes, and/or web page to query edges. A query edge may have a weight corresponding to a frequency at which a query was executed shortly a browse event of a web page. In another example, the pattern extraction component 206 may generate the candidate query set. The candidate query set may comprise one or more queries executed shortly after users visited a web page.

The feature extraction component 212 may be configured to extract features 214 of one or more queries associated with a web page. For example, the feature extraction component 212 may extract features 214 of queries within a candidate query set corresponding to the web page. The feature extraction component 212 may extract features 214 from a bipartite graph, web page data 210 (e.g., URL, title, body, etc.), and/or a candidate query set of the web page. In one example, the feature extraction component 212 may extract features 214, such as query length, unique word count within query, maximum word length of query, term frequency, inverse document frequency, and/or LMIR with ABS, DIR, or JM smoothing. In another example, the feature extraction component may extract features 214, such as query visibility, query popularity, and/or pattern frequency, from within the bipartite graph.

The ranking component 216 may be configured to rank the one or more queries associated with the web page (e.g., queries within the candidate query set). The queries may be ranked using a learning to rank model and/or the extracted features 214. The queries may be ranked based upon how likely content of the web page triggered (compelled) users to execute the queries shorting after visiting the web page. In one example, queries having a low search trigger likelihood may be eliminated, for example, from the candidate query set to generate ranked queries 218. The learning to rank model may be updated based upon how queries were ranked.

The diversification component 220 may be configured to select the diverse subset of queries 222 from within the ranked queries 218 using an objective function. The diverse subset of queries 222 may have selected queries having a broad range of topics from within the web page (e.g., if the ranked queries 218 comprise multiple queries having a similar topic and other queries having different topics, then one or more of the queries having similar topics may be eliminated to allow for selection of other queries have different topics). In one example, the objective function may have a dissimilarity feature configured to calculate dissimilarities of topics corresponding to the ranked queries of the web page. In another example, the objective function may have a search trigger likelihood feature configured to determine the likelihood that content within the web page triggered users to execute the queries shortly after viewing the web page. That is, the diverse subset of queries 222 may be ordered based upon the likelihood that the web page motivated the user to execute the queries. In this way, the diversification component 220 may select queries having diverse range of topics and high search trigger likelihoods.

Figure 3:
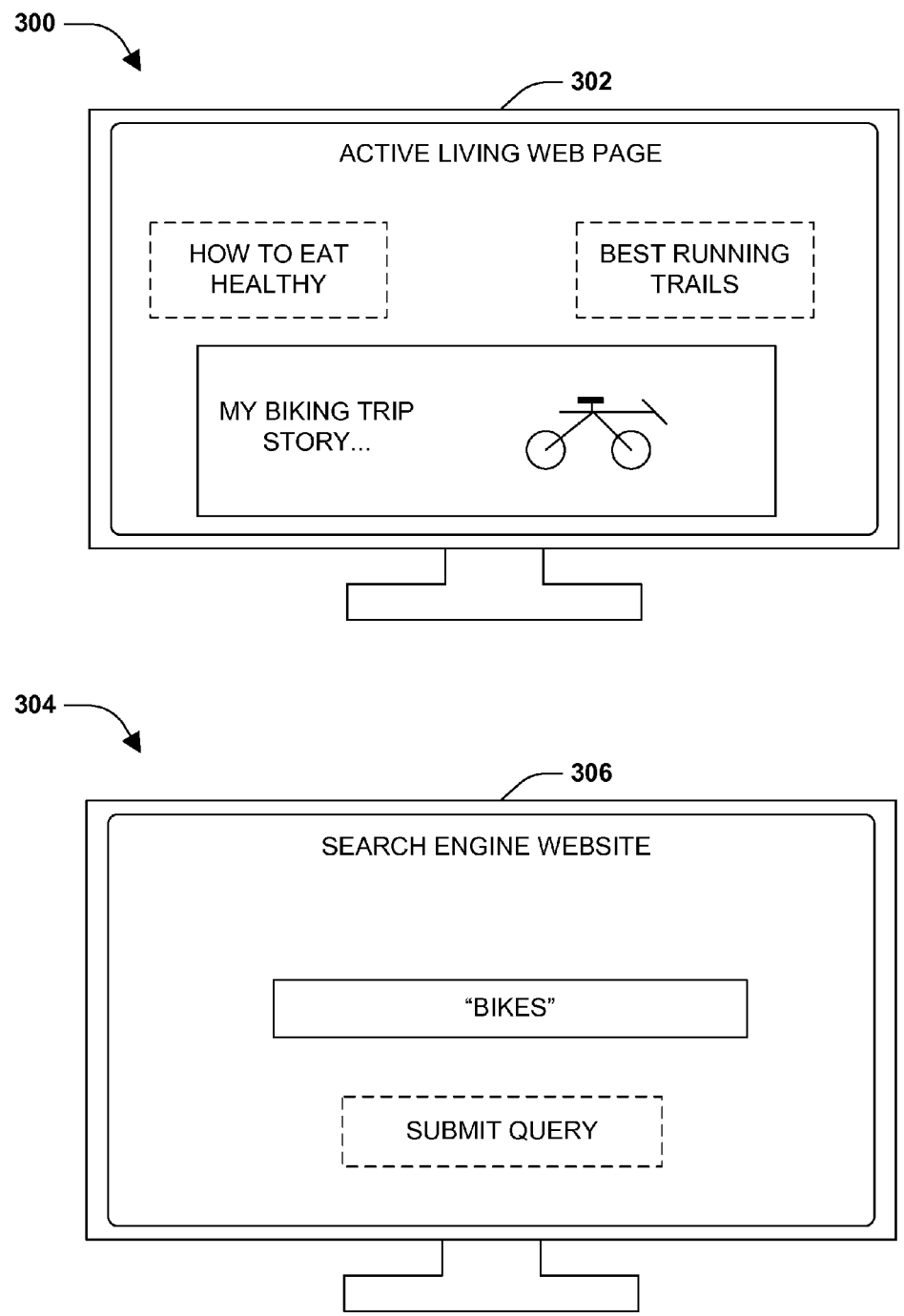
FIG. 3 is an illustration of an example of a browse event and a search event.

FIG. 3 illustrates an example of a browse event 300 and a search event 304. An active living web page 302 may be available through the internet for users to browse. The active living web page 302 may comprise content based upon a variety of topics. For example, information on eating healthy, running trails, bike trips, and/or other topics may be provided through the active living web page 302. Over time, a variety of users having a wide range of interests may visit the active living web page 302. Respective visits may be stored as browse events. Some of the users may navigate away from the active living web page 302 when done. Shortly after visiting the active living web page 302, some users may be motivated by content of the active living web page 302 to perform search queries for additional information. Other users may perform search queries for reasons other than content of the active living web page 302 (e.g., shortly after viewing the active living web page 302, a user may perform a search for airline tickets because a co-worker reminded the user of an upcoming business trip).

In one example, a user may visit the active living web page 302, which may be stored as the browse event 300. During the visit, the user may read a biking trip story within the active living web page 302. The biking trip story may motivate the user to inquire further about bikes. Shortly after visiting the active living web page 302, the user may submit a query "bikes" to a search engine website 306 because content within the active living web page 302 triggered the user to inquire further into biking. The query "bikes" may be stored as the search event 304. It may be appreciated that the browse event 300 and the search event 304 may be stored in a user browsing behavior dataset. In one example, the search event 304 may be labeled as a query related to content of the active living web page 302, and thus may be determined to have a high search trigger likelihood.

Figure 4:
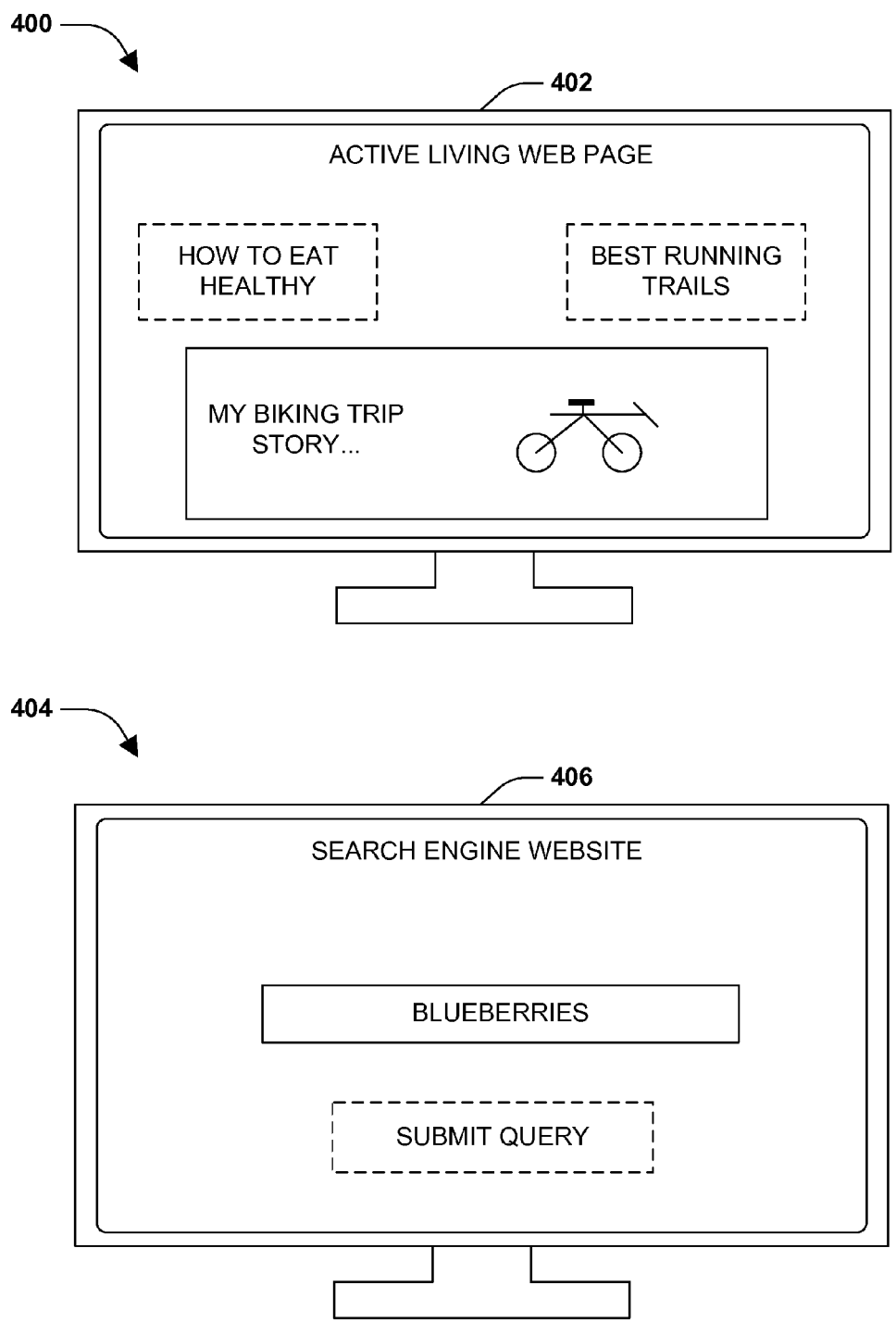
FIG. 4 is an illustration of an example of a browse event and a search event.

FIG. 4 illustrates an example of a browse event 400 and a search event 404. In one example, a user may visit the active living web page 402, which may be stored as the browse event 400. During the visit, the user may read an article about how to eat healthy within the active living web page 402. The healthy eating article may motivate the user to inquire further about healthy food. Shortly after visiting the active living web page 402 (e.g., the immediate next web page), the user may submit a query "blueberries" to a search engine website 406 because content within the active living web page 402 triggered the user to inquire further into healthy food. The query "blueberries" may be stored as the search event 404. It may be appreciated that the browse event 400 and the search event 404 may be stored in a user browsing behavior dataset. In one example, the search event 404 may be labeled as a query related to content of the active living web page 402, and thus may be determined to have a high search trigger likelihood.

Figure 5:
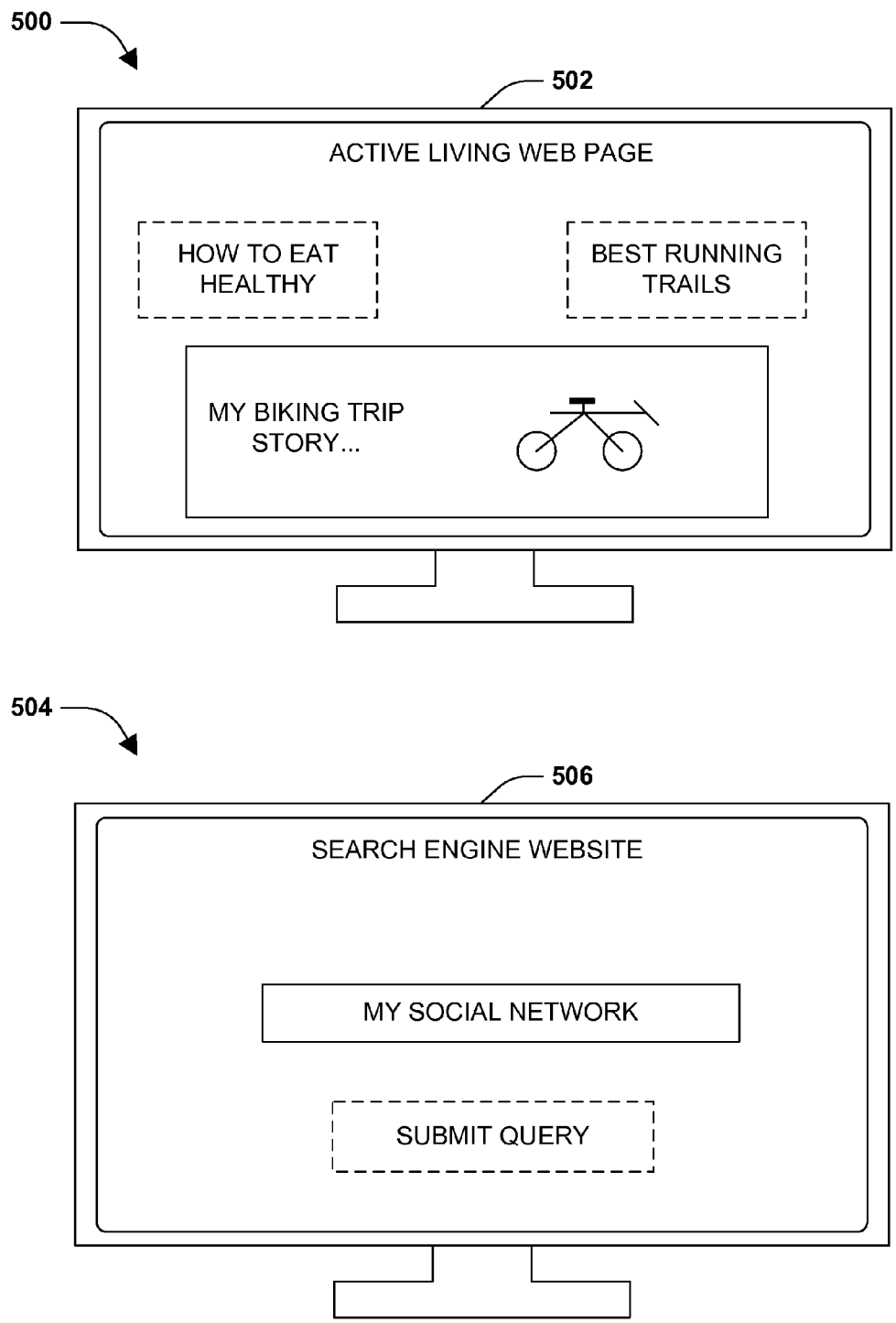
FIG. 5 is an illustration of an example of a browse event and a search event.

FIG. 5 illustrates an example of a browse event 500 and a search event 504. In one example, a user may visit the active living web page 506, which may be stored as the browse event 500. After viewing content of the active living web page 506, the user may decide to check a social network for status updates. The user may submit the query "my social network" within a search engine website 506, which may be stored as the search event 504. The browse event 500 and the search event 504 may be stored in a user browsing behavior dataset. In one example, the search event 504 may be labeled as a query unrelated to content of the active living web page 502, and thus may be determined to have a low search trigger likelihood.

Figure 6:
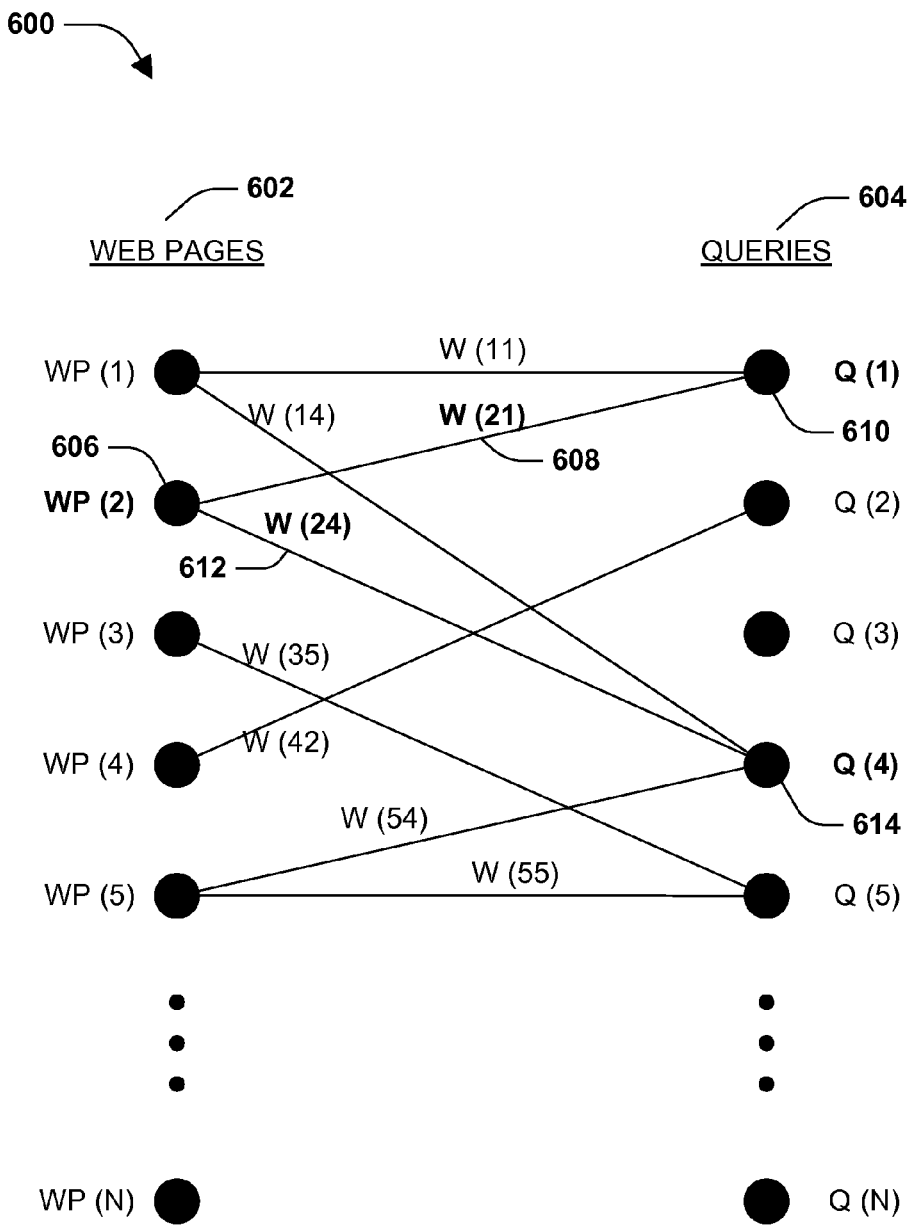
FIG. 6 is an illustration of an example of a bipartite graph.

FIG. 6 illustrates an example of a bipartite graph 600. The bipartite graph 600 may comprise web page nodes 602 (e.g., WP (1), WP (2) 606, WP (3), etc.), query nodes 604 (e.g., Q (1) 610, Q (2), Q (4) 614, etc.), and web page to query edges (e.g., W(11) from web page 1 to query 1, W(21) from web page 2 to query 1, etc.). The web page to query edges may have weights corresponding to a frequency at which a query was performed shortly after a web page was visited and/or some other metric. In one example, WP (2) 606 is connected to Q (1) 610 by W (21) 608. That is, web page 2 is connected to query 1 by web page to query edge 21. A weight associated with web page to query edge 21 may be a frequency, or some other metric, indicating a number of times a user performed query 1 shortly after visiting web page 2. WP (2) 606 is also connected to Q (4) 614 by W (24) 612. That is, web page 2 is connected to query 4 by web page to query edge 24. A weight associated with web page to query edge 24 may be a frequency, or some other metric, indicating a number of times a user performed query 4 shortly after visiting web page 2.

Features may be extracted from the bipartite graph 600. For example, query visibility, query popularity, pattern frequency, and/or other features may be extracted from the bipartite graph 600. Query visibility may be a number of edges linking to a query. If the query visibility is large, then numerous users asked for the query after visiting a wide range of different web pages. Query popularity may be a sum of weights of all edges linking a query. If a query has large query popularity, then its total number of occurrences in the extracted browse patterns is large. Pattern frequency may be the weight of an edge between a query and a given page. Pattern frequency may reflect whether the same query is issued by many users after reading a web page, which may show a high likelihood that content on the web page triggered users to perform the query. It may be appreciated that the bipartite graph 600 may be normalized (re-weighted) so that a dissimilarity feature may calculate query dissimilarity.

Figure 7:
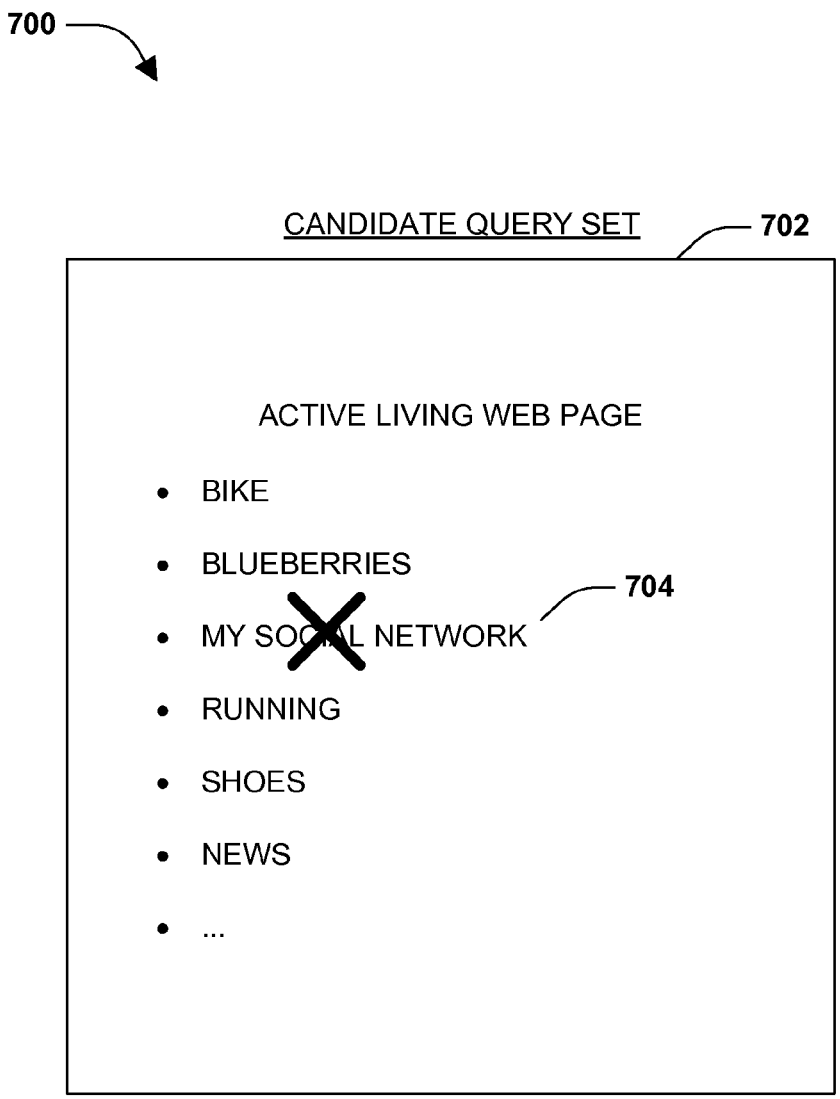
FIG. 7 is an illustration of an example of a candidate query set.

FIG. 7 illustrates an example 700 of a candidate query set 702. The candidate query set 702 may comprise queries executed by users shortly after visiting an active living web page as indicated by one or more browse search patterns. The queries within the candidate query set 702 may be labeled. In one example, queries labeled as key phrases of the web page or relating to non-key phrase content of the web page may be regarded as having a high search trigger likelihoods. The queries labeled as famous sites, unrelated topics, repeated searches, query refinement, and/or cannot judge may be regarded as having a low search trigger likelihoods. In one example, queries having low search trigger likelihoods may be eliminated.

The candidate query set 702 may comprise queries: "bike", "blueberries", "running", "shoes", and others not illustrated, which may be regarded as having high search trigger likelihoods. The candidate query set 702 may comprise queries: "my social network" 704, "news", and others not illustrated, which may be regarded as having low search trigger likelihoods. For example, it may be determined that "my social network" 704 has a label of unrelated topic. In this way, the "my social network" 704 query may be eliminated from the candidate query set 702.

Figure 8:
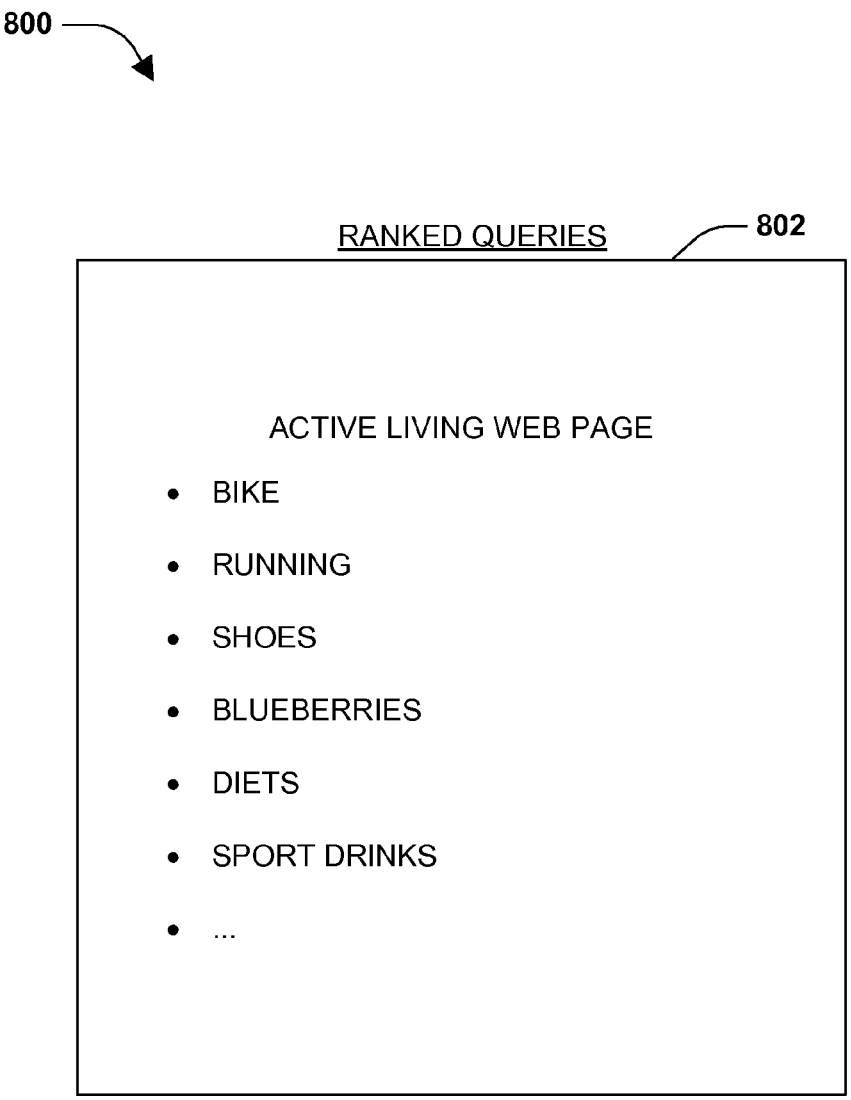
FIG. 8 is an illustration of an example of ranked queries for an active living web page.

FIG. 8 illustrates an example 800 of ranked queries 802 for an active living web page. For illustrative purposes, the ranked queries 802 may be based upon ranking a candidate query set of the active living web page, such as the candidate query set 702 of FIG. 7. In one example, the queries: "bike", "running", "shoes", "blueberries", "diets", "sports drinks", and other queries not illustrated may corresponding to various search trigger likelihoods. That is, "bike" may have the search trigger likelihood, while "diets" may have a medium search trigger likelihood. In this way, queries may be ranked for the active living web page. In one example, queries having a low ranking may be eliminated from the ranked queries 802.

Figure 9:
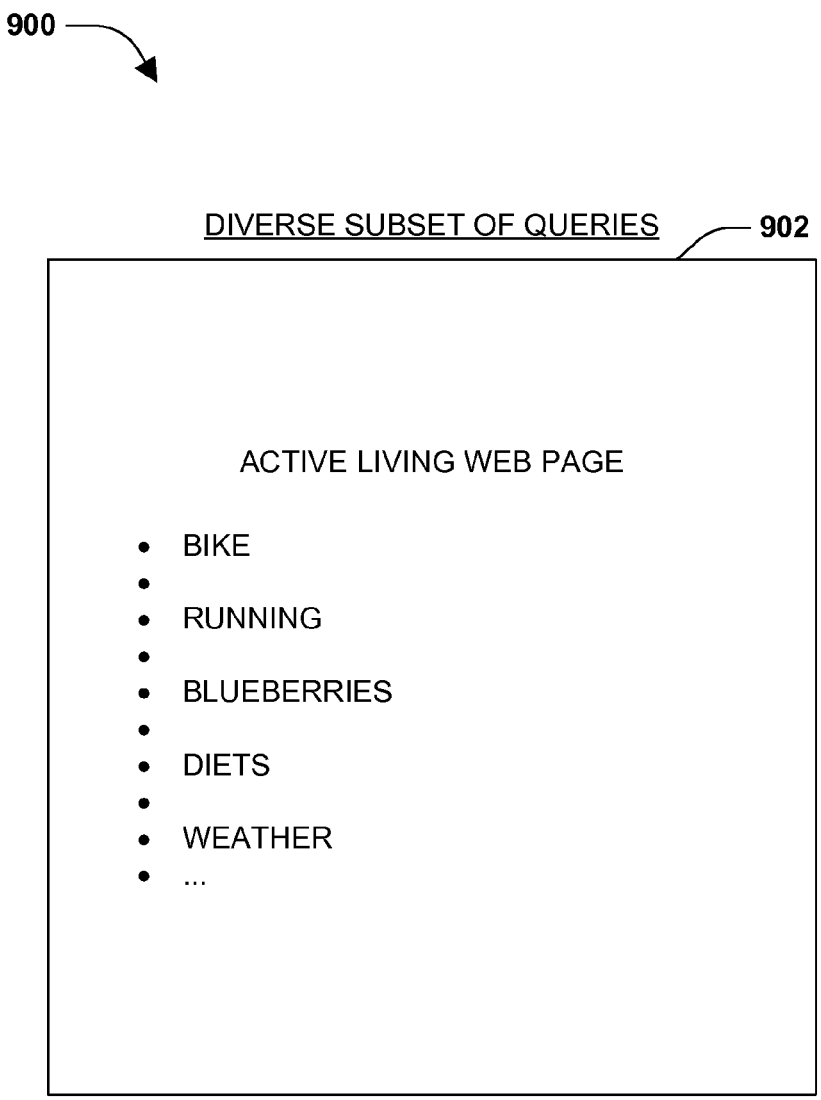
FIG. 9 is an illustration of an example of diverse subset of queries for an active living web page.

FIG. 9 illustrates an example 900 of a diverse subset of queries 902 for an active living web page. For illustrative purposes, the diverse subset of queries 902 may be based upon selecting a diverse subset of queries from ranked queries of the active living web page, such as the ranked queries 802 of FIG. 8. The diverse subset of queries may comprise queries having a high search trigger likelihood (e.g., a 65% chance the query was motivated based upon content of the web page). In one example, ranked queries for the active living web page may be: "bike", "running", "shoes", "blueberries", "diets", "sports drinks", "fruit", "apples", "weather", and/or other queries not illustrated. In this way, queries may be selected so that the resulting diverse subset of queries has a wide range of topics. For example, "bike" and "running" may be selected, whereas "shoes" is not because two sports topics are already selected. Also, "blueberries" and "diets" may be selected, whereas "fruit", "sports drinks", and "apples" are not because two food topics are already selected. "Weather" may be selected because no other queries have the topic of weather. In this way, a diverse subset of queries is selected, such that the resulting queries have diverse topics and high search trigger likelihoods. Having diverse topics is advantageous because users with a wide variety of interest may visit the web page and find different content interesting. In one example, the diverse subset of queries may be presented to users visiting the active living web page. In another example, additional information (e.g., ads, images, etc.) may be derived from the diverse subset of queries and/or presented to users.

Figure 10:
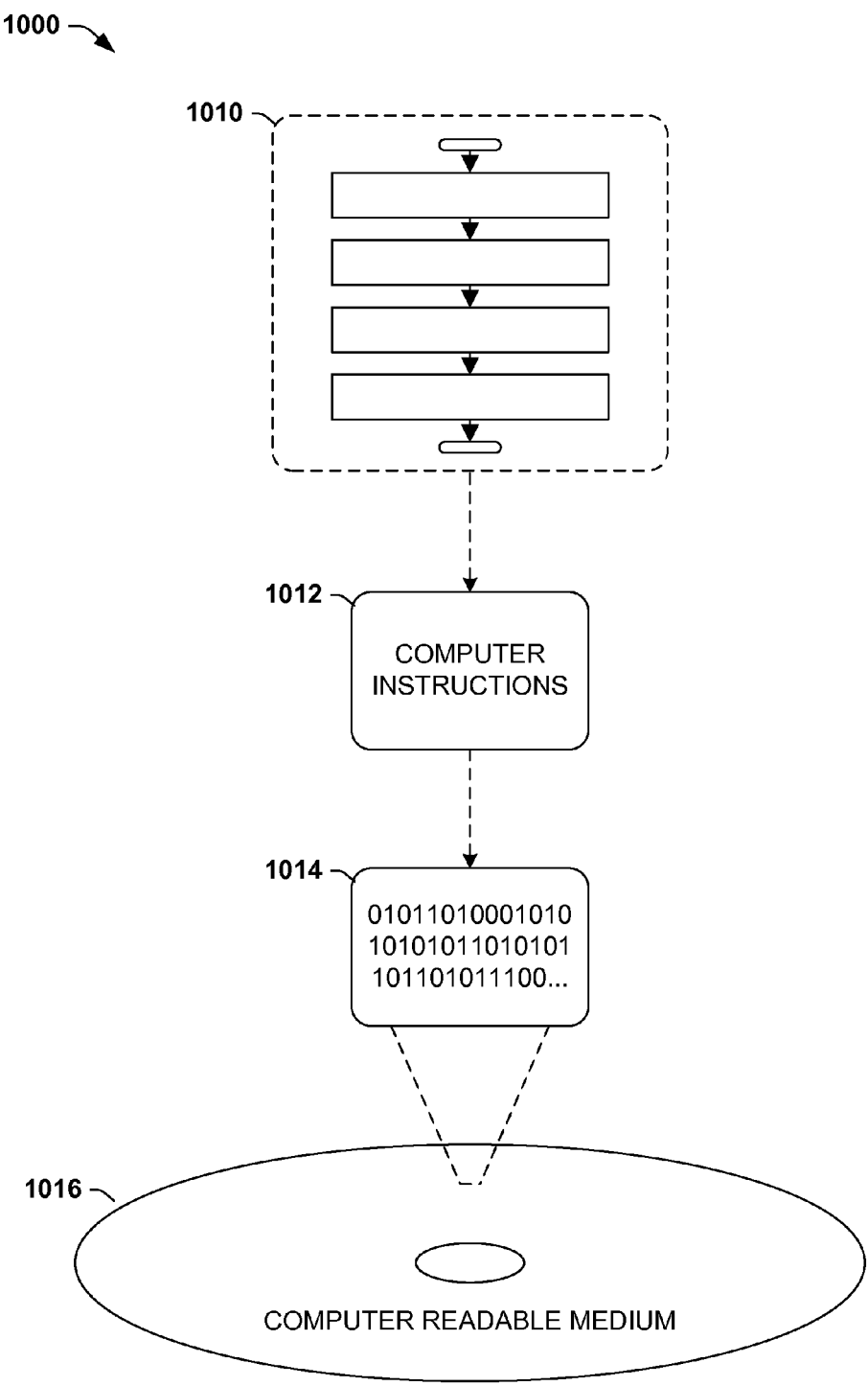
FIG. 10 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 10, wherein the implementation 1000 comprises a computer-readable medium 1016 (e.g., a CD-R, DVD-R, or a platter of a hard disk drive), on which is encoded computer-readable data 1014. This computer-readable data 1014 in turn comprises a set of computer instructions 1012 configured to operate according to one or more of the principles set forth herein. In one such embodiment 1000, the processor-executable computer instructions 1012 may be configured to perform a method 1010, such as the exemplary method 100 of FIG. 1, for example. In another such embodiment, the processor-executable instructions 1012 may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 11:
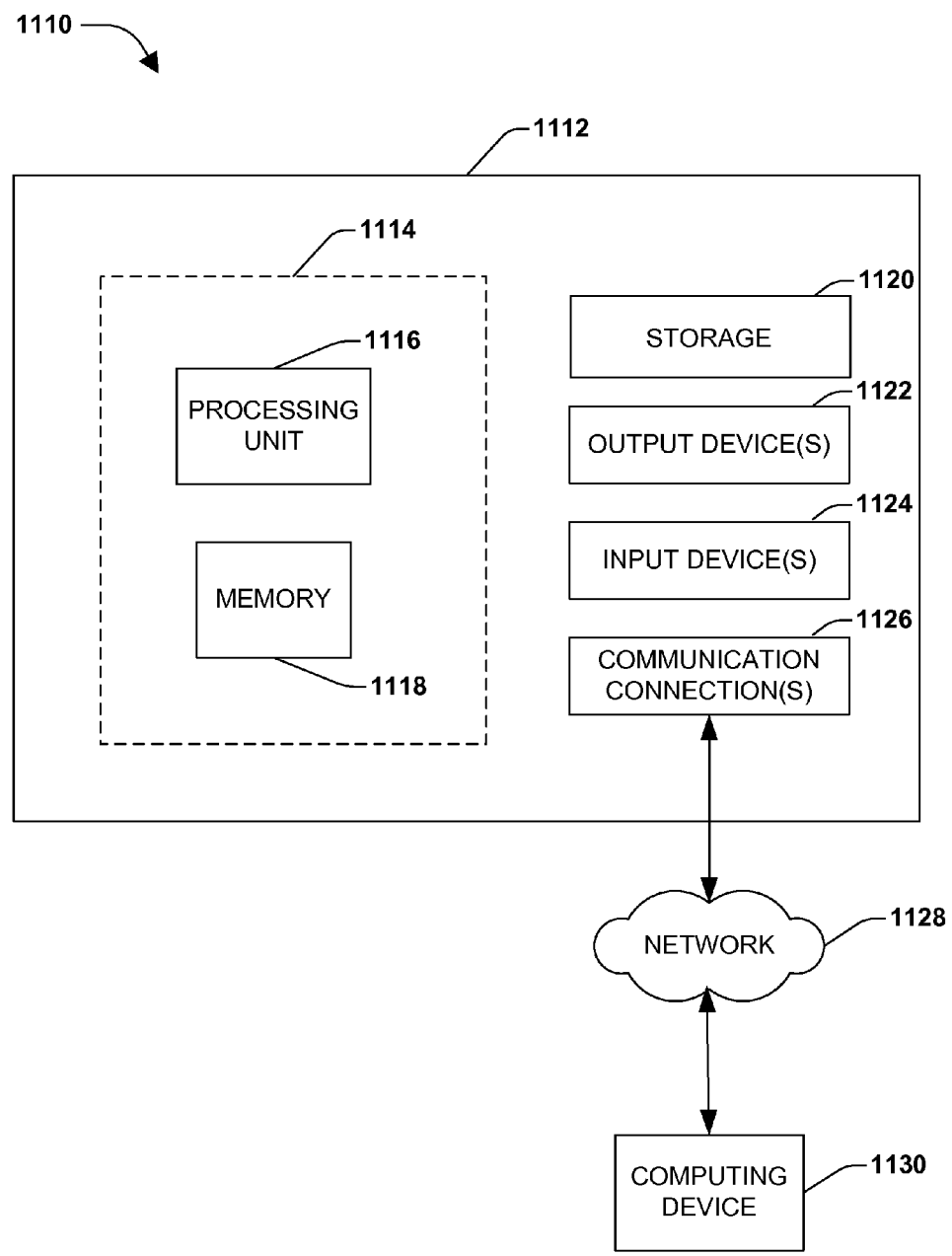
FIG. 11 illustrates an exemplary computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1110 comprising a computing device 1112 configured to implement one or more embodiments provided herein. In one configuration, computing device 1112 includes at least one processing unit 1116 and memory 1118. Depending on the exact configuration and type of computing device, memory 1118 may be volatile (such as RAM, for example), non-volatile (such as ROM, flash memory, etc., for example) or some combination of the two. This configuration is illustrated in FIG. 11 by dashed line 1114.

In other embodiments, device 1112 may include additional features and/or functionality. For example, device 1112 may also include additional storage (e.g., removable and/or non-removable) including, but not limited to, magnetic storage, optical storage, and the like. Such additional storage is illustrated in FIG. 11 by storage 1120. In one embodiment, computer readable instructions to implement one or more embodiments provided herein may be in storage 1120. Storage 1120 may also store other computer readable instructions to implement an operating system, an application program, and the like. Computer readable instructions may be loaded in memory 1118 for execution by processing unit 1116, for example.

The term "computer readable media" as used herein includes computer storage media. Computer storage media includes volatile and nonvolatile, removable and non-removable media implemented in any method or technology for storage of information such as computer readable instructions or other data. Memory 1118 and storage 1120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1112. Any such computer storage media may be part of device 1112.

Device 1112 may also include communication connection(s) 1126 that allows device 1112 to communicate with other devices. Communication connection(s) 1126 may include, but is not limited to, a modem, a Network Interface Card (NIC), an integrated network interface, a radio frequency transmitter/receiver, an infrared port, a USB connection, or other interfaces for connecting computing device 1112 to other computing devices. Communication connection(s) 1126 may include a wired connection or a wireless connection. Communication connection(s) 1126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1112 may include input device(s) 1124 such as keyboard, mouse, pen, voice input device, touch input device, infrared cameras, video input devices, and/or any other input device. Output device(s) 1122 such as one or more displays, speakers, printers, and/or any other output device may also be included in device 1112. Input device(s) 1124 and output device(s) 1122 may be connected to device 1112 via a wired connection, wireless connection, or any combination thereof. In one embodiment, an input device or an output device from another computing device may be used as input device(s) 1124 or output device(s) 1122 for computing device 1112.

Components of computing device 1112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1112 may be interconnected by a network. For example, memory 1118 may be comprised of multiple physical memory units located in different physical locations interconnected by a network.

Those skilled in the art will realize that storage devices utilized to store computer readable instructions may be distributed across a network. For example, a computing device 1130 accessible via a network 1128 may store computer readable instructions to implement one or more embodiments provided herein. Computing device 1112 may access computing device 1130 and download a part or all of the computer readable instructions for execution. Alternatively, computing device 1112 may download pieces of the computer readable instructions, as needed, or some instructions may be executed at computing device 1112 and some at computing device 1130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method comprising:
    identifying browse events indicating that web pages were accessed over the Internet at corresponding Uniform Resource Locators by user computing devices;
    identifying search events indicating that the user computing devices submitted natural language queries to a search engine website over the Internet;

evaluating the browse events and the search events to extract browse search patterns indicating that individual search events occurred within a specified time period after individual browse events;

identifying a candidate query set for a particular web page based at least on a particular browse search pattern for the particular web page, the candidate query set comprising different natural language queries that were submitted over the Internet to the search engine website by particular user computing devices within the specified time period after visiting the particular web page at a particular Uniform Resource Locator;

extracting query features of the different natural language queries of the candidate query set;

ranking the different natural language queries of the candidate query set based at least upon the query features;

selecting a diverse subset of natural language query suggestions from within the ranked natural language queries, the diverse subset of natural language query suggestions being associated with a diverse range of topics within the particular web page and including at least a first natural language query that was submitted over the Internet by a first user computing device to the search engine website after visiting the particular web page and a second natural language query that was submitted over the Internet by a second user computing device to the search engine website after visiting the particular web page; and responsive to another user computing device accessing the particular web page over the Internet via the particular Uniform Resource Locator, sending the diverse subset of natural language query suggestions over the Internet to the another user computing device, including at least the first natural language query that was submitted by the first user computing device to the search engine website within the specified time period after visiting the particular web page and the second natural language query that was submitted by the second user computing device to the search engine website within the specified time period after visiting the particular web page.

2. The method of claim 1, further comprising:
extracting web page features from the particular web page, the web page features characterizing at least one of a title, a resource locator, or a body of the particular web page.

3. The method of claim 2, the ranking comprising:
using the web page features and the query features, determining corresponding likelihoods that accessing the particular web page triggered previous users to submit the different natural language queries to the search engine website.

4. The method of claim 1, comprising:
making a determination that a particular natural language query that was previously submitted to the search engine website after visiting the particular web page is unrelated to the particular web page; and
excluding the particular natural language query from the candidate query set based at least upon the determination.

5. The method of claim 1, the query features comprising:
query lengths of the different natural language queries;
unique word counts within the different natural language queries; and
maximum word lengths of the different natural language queries.

6. The method of claim 1, further comprising:
building a bipartite graph comprising:
a plurality of web page nodes representing the web pages, including a particular web page node representing the particular web page,
query nodes representing respective queries executed after visiting the web pages, including a first query node representing the first natural language query and a second query node representing the second natural language query, and
web page to query edges having weights representing corresponding frequencies with which individual natural language queries are executed after visiting corresponding web pages, including a first web page to query edge connecting the particular web page node to the first query node and a second web page to query edge connecting the particular web page node to the second query node.

7. The method of claim 6, the query features for the first natural language query comprising:
a query visibility feature representing a number of edges linking to the first query node in the bipartite graph,
a query popularity feature representing a sum of weights of the edges linking to the first query node in the bipartite graph, and
a pattern frequency feature representing a corresponding weight of the first web page to query edge of the bipartite graph.

8. The method of claim 1, the selecting the diverse subset of natural language query suggestions comprising:
selecting the diverse subset of natural language query suggestions based at least upon a dissimilarity measurement feature.

9. The method of claim 1, the selecting the diverse subset of natural language query suggestions comprising:
selecting the diverse subset of natural language query suggestions based at least upon a search trigger likelihood feature.

10. The method of claim 9, the search trigger likelihood feature for the first natural language query indicative of a likelihood that content within the particular web page triggered a first previous user to submit the first natural language query to the search engine website after viewing the particular web page.

11. The method of claim 1, wherein the specified time period for the browse search patterns requires the individual search events to occur immediately after the individual browse events.

12. The method of claim 1, wherein the specified time period for the browse search patterns requires the individual search events to occur within a predetermined number of minutes or seconds of the individual browse events.

13. The method of claim 1, performed entirely by the search engine website.

14. A system comprising:
at least one processing unit; and
at least one memory storing instructions which, when executed by the at least one processing unit, cause the at least one processing unit to:
identify browse events indicating that web pages were accessed over the Internet at corresponding Uniform Resource Locators by user computing devices;
identify search events indicating that the user computing devices submitted natural language queries to a search engine website over the Internet;
evaluate the browse events and the search events to extract browse search patterns indicating that individual search events occurred within a specified time period after individual browse events;

identify a candidate query set for a particular web page based at least on a particular browse search pattern for the particular web page, the candidate query set comprising different natural language queries that were submitted over the Internet to the search engine website by particular user computing devices within the specified time period after visiting the particular web page at a particular Uniform Resource Locator;

extract query features of the different natural language queries of the candidate query set;

rank the different natural language queries of the candidate query set based at least upon the query features;

select a diverse subset of natural language query suggestions from within the ranked natural language queries, the diverse subset of natural language query suggestions being associated with a diverse range of topics within the particular web page and including at least a first natural language query that was submitted over the Internet by a first user computing device to the search engine website after visiting the particular web page and a second natural language query that was submitted over the Internet by a second user computing device to the search engine website after visiting the particular web page; and responsive to another user computing device accessing the particular web page over the Internet via the particular Uniform Resource Locator, send the diverse subset of natural language query suggestions over the Internet to the another user computing device, including at least the first natural language query that was submitted by the first user computing device to the search engine website within the specified time period after visiting the particular web page and the second natural language query that was submitted by the second user computing device to the search engine website within the specified time period after visiting the particular web page.

15. The system of claim 14, wherein the instructions, when executed by the at least one processing unit, cause the at least one processing unit to:

extract web page features from the particular web page, the web page features characterizing at least one of a title, a resource locator, or a body of the particular web page;

using the web page features and the query features, determine corresponding likelihoods that accessing the particular web page triggered previous users to submit the different natural language queries to the search engine website; and rank the different natural language queries using the corresponding likelihoods.

16. The system of claim 14, wherein the instructions, when executed by the at least one processing unit, cause the at least one processing unit to:

select the diverse subset of natural language query suggestions based at least upon a dissimilarity measurement feature.

17. The system of claim 14, wherein the instructions, when executed by the at least one processing unit, cause the at least one processing unit to:

select the diverse subset of natural language query suggestions based at least upon a search trigger likelihood feature.

18. The system of claim 17, the search trigger likelihood feature for the first natural language query being indicative of a likelihood that content within the particular web page triggered a first previous user to submit the first natural language query to the search engine website after viewing the particular web page.

19. The system of claim 14, wherein the specified time period for the browse search patterns requires the individual search events to occur immediately after the individual browse events.

20. The system of claim 14, wherein the specified time period for the browse search patterns requires the individual search events to occur within a predetermined number of minutes or seconds after the individual browse events.

21. A hardware computer-readable storage medium storing processor-executable instructions which, when executed by a processor, cause the processor to perform acts comprising:

identifying browse events indicating that web pages were accessed over the Internet at corresponding Uniform Resource Locators by user computing devices;

identifying search events indicating that the user computing devices submitted natural language queries to a search engine website over the Internet;

evaluating the browse events and the search events to extract browse search patterns indicating that individual search events occurred within a specified time period after individual browse events;

identifying a candidate query set for a particular web page based at least on a particular browse search pattern for the particular web page, the candidate query set comprising different natural language queries that were submitted over the Internet to the search engine website by particular user computing devices within the specified time period after visiting the particular web page at a particular Uniform Resource Locator;

extracting query features of the different natural language queries of the candidate query set;

ranking the different natural language queries of the candidate query set based at least upon the query features;

selecting a diverse subset of natural language query suggestions from within the ranked natural language queries, the diverse subset of natural language query suggestions being associated with a diverse range of topics within the particular web page and including at least a first natural language query that was submitted over the Internet by a first user computing device to the search engine website after visiting the particular web page and a second natural language query that was submitted over the Internet by a second user computing device to the search engine website after visiting the particular web page; and responsive to another user computing device accessing the particular web page over the Internet via the particular Uniform Resource Locator, sending the diverse subset of natural language query suggestions over the Internet to the another user computing device, including at least the first natural language query that was submitted by the first user computing device to the search engine website within the specified time period after visiting the particular web page and the second natural language query that was submitted by the second user computing device to the search engine website within the specified time period after visiting the particular web page.

* * * * *